(12) United States Patent
Tret'Jakov et al.

(10) Patent No.: US 9,375,702 B2
(45) Date of Patent: Jun. 28, 2016

(54) METHOD FOR PRODUCING A COMPLEX-FORMING SORBENT FOR SELECTIVE EXTRACTION OF INDIUM

(71) Applicant: Joint-stock company "AXION-Rare-Earth and Noble Metals", Perm (RU)

(72) Inventors: Vitaly Aleksandrovich Tret'Jakov, Perm (RU); Dmitriy Alekseevich Kondruckiy, Volzhskiy (RU); Gadzhi Rabadanovich Gadzhiev, Volzhskiy (RU); Aleksandr Fadeevich Bobrov, Moscow (RU); Alexei Gennadievich Nesterov, Moscow (RU)

(73) Assignee: Joint-Stock Company "AXION-Rare-Earth and Noble Metals", Perm (RU)

( * ) Notice: Subject to any disclaimer, the term of this patent is extended or adjusted under 35 U.S.C. 154(b) by 0 days.

(21) Appl. No.: 14/418,036

(22) PCT Filed: Mar. 13, 2013

(86) PCT No.: PCT/RU2013/000194
§ 371 (c)(1),
(2) Date: Jan. 28, 2015

(87) PCT Pub. No.: WO2014/021734
PCT Pub. Date: Feb. 6, 2014

(65) Prior Publication Data
US 2015/0258528 A1 Sep. 17, 2015

(30) Foreign Application Priority Data
Jul. 29, 2012 (RU) ................................ 2012132262

(51) Int. Cl.
| | |
|---|---|
| C08F 8/40 | (2006.01) |
| B01J 20/26 | (2006.01) |
| B01J 45/00 | (2006.01) |
| B01J 20/22 | (2006.01) |
| B01J 20/30 | (2006.01) |
| C08F 212/36 | (2006.01) |
| C08F 220/44 | (2006.01) |
| C02F 1/42 | (2006.01) |
| C02F 101/20 | (2006.01) |
| C02F 103/16 | (2006.01) |

(52) U.S. Cl.
CPC .............. B01J 20/267 (2013.01); B01J 20/223 (2013.01); B01J 20/3007 (2013.01); B01J 20/3085 (2013.01); B01J 45/00 (2013.01); C08F 8/40 (2013.01); C08F 212/36 (2013.01); C08F 220/44 (2013.01); *C02F 1/42* (2013.01); *C02F 2101/20* (2013.01); *C02F 2103/16* (2013.01)

(58) Field of Classification Search
None
See application file for complete search history.

(56) References Cited

U.S. PATENT DOCUMENTS

| | | | | |
|---|---|---|---|---|
| 4,459,386 | A | * | 7/1984 | Grundmann ............... C08F 8/40 525/157 |
| 4,565,673 | A | | 1/1986 | Kataoka et al. |
| 5,281,631 | A | * | 1/1994 | Horwitz .................... B01J 39/20 210/681 |
| 5,449,462 | A | | 9/1995 | Horwitz et al. |
| 5,539,003 | A | | 7/1996 | Horwitz et al. |
| 5,582,737 | A | | 12/1996 | Gula et al. |
| 5,618,851 | A | * | 4/1997 | Trochimcznk ........... B01J 39/12 521/30 |
| 6,232,353 | B1 | * | 5/2001 | Alexandratos ......... B01J 39/043 210/673 |
| 7,611,631 | B2 | | 11/2009 | Ohnishi et al. |

FOREIGN PATENT DOCUMENTS

| | | |
|---|---|---|
| RU | 2462297 C2 | 3/2012 |
| SU | 531815 A | 9/1976 |
| SU | 724528 A1 | 3/1980 |
| SU | 907007 A1 | 2/1982 |
| SU | 1471934 A3 | 4/1989 |

OTHER PUBLICATIONS

Nov. 14, 2013—(PCT) Search Report—App PCT/RU2013/000194—Eng Tran.
Feb. 21, 2013—(RU) Search Report—App RU 2012132262 (Russian Priority Document).

* cited by examiner

*Primary Examiner* — Robert C Boyle
(74) *Attorney, Agent, or Firm* — Banner & Witcoff, Ltd.

(57) ABSTRACT

The invention relates to the field of ion exchange with the formation of a complex or chelate by using complex-forming polymers and can be used in nonferrous metallurgy and hydrometallurgy of indium for extraction of indium from wastewaters, as well as in the chemical industry and for producing special-purity substances.
A method for producing a complex-forming sorbent for selective extraction of indium is proposed, wherein the method comprises the introduction of gem-diphosphonic functional groups, and wherein, in order to increase the selectivity and sorption capacity for indium, the gem-diphosphonic functional groups are introduced by the treatment of a spherically granulated cross-linked macroporous acrylonitrile-divinylbenzene copolymer with phosphorous acid at temperature of from 140 to 160° C. for from 13 to 35 hours. In the presence of a diluent (chlorobenzene), the method is carried out at a temperature of between 100 and 130° C.
The technical result is to introduce gem-diphosphonic functional groups by the treatment of spherically granulated cross-linked macroporous acrylonitrile-divinylbenzene copolymer with phosphorous acid, which simplifies the method for production and increases capacity and selectivity of the synthesized sorbent for indium, thus improving a complex of the application properties of the material.

3 Claims, No Drawings

METHOD FOR PRODUCING A COMPLEX-FORMING SORBENT FOR SELECTIVE EXTRACTION OF INDIUM

CROSS-REFERENCE TO RELATED APPLICATIONS

This application is a U.S. National Stage application under 35 U.S.C. §371 of International Application PCT/RU2013/000194 (published as WO 2014/021734 A1), filed Mar. 13, 2013, which claims priority to Application RU 2012132262, filed Jul. 29, 2012. Benefit of the filing date of each of these prior applications is hereby claimed. Each of these prior applications is hereby incorporated by reference in its entirety.

The invention relates to the field of ion exchange with the formation of a complex or chelate by using complex-forming polymers and can be used in nonferrous metallurgy and hydrometallurgy of indium, in the extraction of indium from wastewaters, as well as in the chemical industry and for producing special-purity substances [C08F8/40; B01J45/00].

Most of the known ion-exchange and sorption materials exhibit a reduced selectivity in the methods of extracting indium due to steric hindrance for the formation of coordinatively saturated complexes of indium with the functional groups of an ion-exchange material because of their spacing from each other, distorted geometry and poor availability caused by the influence of the polymer structure of the material. However, in most cases, the processes of extraction and concentration of indium from various process solutions should have a high selectivity and sorption capacity because of a high concentration of salt impurities, for example, in extraction of indium from zinc-production wastes.

The known complex-forming sorbents suitable for selective sorption of indium can be divided into two classes:
the first class includes iminodiacetate group-containing sorbents;
the second class includes phosphonic group-containing sorbents [1, 2, 3].

A disadvantage of extraction of indium with the iminodiacetate group-containing sorbents of the first class [1] is that it requires a labor-consuming step of adjusting the pH of a process solution to about 1.5 at which the sorbents have the highest selectivity for indium, thus significantly complicating the method of extracting indium from actual process solutions. Another significant disadvantage of this class includes a low capacity of the sorbents for indium (0.184 mmol/g) when providing maximum selectivity (70-80%).

Phosphonic group-containing sorbents of the second class can be divided into the following types:
aminomethylphosphonic group-containing sorbents [2],
monophosphonic group-containing sorbents [5]; and
gem-diphosphonic group-containing sorbents [3].

An advantage of the second class sorbents is in their relatively high capacity and selectivity for indium in acidic solutions, in particular, of the gem-diphosphonic group-containing sorbents, for example, Diphonix Resin® (Eichrom Industries).

The closest prior art to the invention is ion-exchange resin Diphonix Resin® (U.S. Pat. No. 5,449,462, C02F 1/62, Dec. 9, 1995) prepared by copolymerization of acrylonitrile, divinylbenzene, styrene and a phosphorus-containing monomer, followed by hydrolysis and sulfonation of the prepared polymer.

Disadvantages of this method include: a reduced selectivity for indium, complexity and multi-step nature of the production process, a long duration of the production cycle, the use of an expensive and hardly accessible phosphorus-containing monomer that is required for introduction of gem-diphosphonic groups, the formation of a large amounts of washing solutions that should be utilized, a need for a complex equipment for the process of synthesis, all of which complicate a large-scale production of this sorbent and limit the fields of its application.

The object of the claimed technical solution is to develop a method for producing a complex-forming sorbent for a selective extraction of indium, which method allows an industrial-scale production of a new complex- and chelate-forming polymer product that can be used for selective extraction and concentration of scattered metal indium from sulfuric process solutions in nonferrous metallurgy, hydrometallurgy, in chemical industry, in water-purifying processes, and for the production of special-purity substances.

The technical result is to introduce gem-diphosphonic functional groups by the treatment of spherically granulated cross-linked macroporous acrylonitrile-divinylbenzene copolymer with phosphorous acid, which simplifies the method of production and increases the capacity and selectivity of the synthesized sorbent for indium, thus improving a complex of the application properties of the material.

Said technical result is achieved by the method for producing a complex-forming sorbent for selective extraction of indium, the method comprising introducing gem-diphosphonic functional groups, wherein the gem-diphosphonic functional groups are introduced by the treatment of a spherically granulated cross-linked macroporous acrylonitrile-divinylbenzene copolymer with phosphorous acid at temperature of from 140 to 160° C. to increase selectivity and sorption capacity for indium. The use of a diluent (chlorobenzene) allows a reduction of the synthesis temperature down to from 100 to 130° C.

The claimed technical solution, compared to the prototype, provides for the introduction of gem-diphosphonic functional groups by the treatment of a spherically granulated cross-linked macroporous acrylonitrile copolymer with phosphorous acid to obtain a complex-forming sorbent for selective extraction of indium, which is a significant advantage because of simplification of the process of production and an increase in selectivity of the sorbent and statical ion-exchange capacity, thus leading to a positive effect on a complex of application properties of the material.

A method for producing a complex-forming sorbent for selective extraction of indium is described by the formation of gem-diphosphonic functional groups by the treatment of a macroporous nitrile copolymer with phosphorous acid at an elevated temperature. The reaction involves the copolymer-contained nitrile groups that add phosphorous acid to the P—H bond while opening the C≡N triple bond at several steps that tentatively include the formation of mixed anhydrides and amides. A catalyst used in the reaction is a proton of phosphorous acid. The chemical conversion results in the formation of a complex-forming sorbent comprising chelatogenous gem-diphosphonic groups, whose structure can be described by general formula:

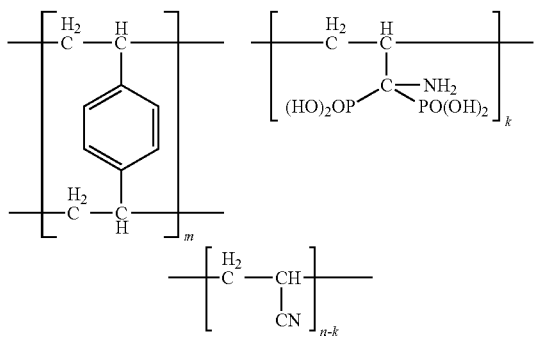

The simplicity of the method allows the formation of a complex-forming sorbent in one step with a good yield. An increase in sorption capacity and selectivity for indium is provided by a high accessibility of the obtained gem-diphosphonic groups and their effective arrangement on the surface of macro- and micropores, which is determined by the conditions of polymer-analogous conversions. The ability of the sorbent to bind selectively indium can be explained by the formation of a complete, saturated ligand shell capable of taking a necessary steric conformation in the presence of indium ion, involving chelatogenous phosphonic groups forming strong coordination chemical bonds due to interaction of electron shells and redistribution of electron densities. This is a fundamental difference of the claimed complex-forming sorbent selective for indium and the method for producing thereof from the sorbent and the method for producing such sorbent, as proposed in the prototype.

The optimal range of temperature for the synthesis conducted in molten phosphorous acid is from 140 to 160° C. When the temperature is lower than 140° C., the synthesis runs very slowly, whereas a temperature higher than 160° C. results in a significant degradation of granules caused by thermal destruction.

The optimal range of temperature for the synthesis in the presence of a diluent (chlorobenzene) is from 100 to 130° C. At a temperature lower than 100° C., the reaction runs very slowly, and a temperature of 131° C. is the boiling point of chlorobenzene.

The use of a diluent makes it possible to reduce the viscosity of the reaction mixture, to decrease the synthesis temperature, and to improve the hydrodynamic of the phosphorylation process. Chlorobenzene is selected due to its sufficiently high polarity that is required for transportation of phosphorous acid, its high boiling point and accessibility.

The optimal duration of the synthesis of a complex-forming sorbent for selective extraction of indium ranges from 13 to 35 hours. Duration less than 13 hours results in the formation of a product with a lower content of phosphorus and, respectively, of gem-diphosphonic groups. Duration of the synthesis more than 35 hours is not feasible since it does not result in a significant increase in the amount of introduced functional gem-diphosphonic groups.

The method is conducted as follows.

A spherically granulated cross-linked macroporous acrylonitrile-divinylbenzene copolymer is loaded to phosphorous acid dehydrated with phosphorus trichloride (the amount of a base compound is not lower than 99%) at 90° C. under stirring. The reaction mixture is heated to from 140 to 160° C. and is aged under stirring for from 13 to 35 hours. After expiration of the synthesis time, the reaction mixture is cooled to 90° C. and the liquid phase is separated by decantation. In case of using a diluent (chlorobenzene), the process is carried out at a temperature of from 100 to 130° C., and, at the end of the synthesis, the reaction mixture is cooled to room temperature. Granules of the product are washed sequentially with water and ethanol. Then, the product is converted into Na-form with an aqueous solution of sodium hydroxide then washed by water and converted into $H^+$-form with an aqueous solution of sulphuric acid. An excess of water is removed on a Nutsche-filter.

EXAMPLE 1

A 2 L round-bottom flask equipped with a reflux condenser, a nitrogen supply tube, and a mechanical mixer and connected with the atmosphere through a chlorocalcium tube was filled with 200 g of phosphorous acid, the condenser and the nitrogen supply were turned on, and the content of the flask was heated to 80° C. to melt the phosphorous acid. Then the mixer was turned on. Moisture, if present in the phosphorous acid, was removed by loading $PCl_3$ in a calculated amount (0.33 mole of $PCl_3$ per one mole of water in the phosphorous acid) through a drop funnel in a rate providing a temperature of the reaction mass not higher than 100° C. After that, 20 g of granules of a dry acrylonitrile-divinylbenzene copolymer were loaded to the resulting melt. The reaction mass was aged for 13 hours at 140° C. and then was cooled to 80° C. The liquid phase was separated by decantation at a temperature of not lower than 75° C. A residue comprising granules of the phosphorylated copolymer was allowed to be cooled to room temperature and was carefully treated with water under cooling. The granules were separated on a Nutsche-filter and washed with ethyl alcohol to remove an excess of phosphorous acid. Then, the product was loaded to a column and converted into Na-form with a 5% alkali solution, then washed by water and converted into $H^+$-form with a 5% sulphuric acid solution. The amount of total phosphorus was 10.1%. The yield was 37%.

EXAMPLE 2

A 2 L round-bottom flask equipped with a reflux condenser, a nitrogen supply tube, and a mechanical mixer and connected with the atmosphere through a chlorocalcium tube was filled with 800 g of chlorobenzene, and the condenser and the mixer were turned on. Then nitrogen supply was turned on. Phosphorous acid was loaded in an amount of 150 g. Moisture, if present in the phosphorous acid, was removed under cooling by loading $PCl_3$ in a calculated amount (0.33 mole of $PCl_3$ per one mole of water in the phosphorous acid) through a drop funnel in a rate providing a temperature of the reaction mass not higher than 40° C. After that the reaction mass was heated up to 90° C. and then 20 g of granules of a dry acrylonitrile-divinylbenzene copolymer was loaded. The reaction mass was aged for 20 hours at 120° C. and then was cooled to room temperature. The liquid phase was separated by decantation. A residue comprising granules of the phosphorylated copolymer was carefully treated with water under cooling, separated on a Nutsche-filter, and washed with ethyl alcohol to remove an excess of phosphorous acid and chlorobenzene. Then, the product was loaded to a column and converted into Na-form with a 5% alkali solution, washed by water, and converted into $H^+$-form with a 5% sulphuric acid solution. The amount of total phosphorus was 8.8%. The yield was 36%.

EXAMPLE 3

The method of synthesis of a selective sorbent was similar to example 2, except for:
a time of aging the reaction mass being 35 hours.
The amount of total phosphorus was 15%. The yield was 47%.

EXAMPLE 4

Determining of the statical exchange capacity of a complex-forming sorbent.

The static exchange capacity of a test sample of the sorbent produced according to the method of example 3 was studied by using a model sulfuric acid solution of $In_2(SO_4)_3$ with a concentration of 7.489 g/l, the solution providing the achievement of the threshold capacity of the sorbent for indium for a day.

The wet sample of the sorbent produced in example 3 weighing 2.005 g was loaded to 200 ml of the model solution and kept for a day, after that the sample was analyzed for a residue amount of indium ions.

Other conditions for the determination of the statical exchange capacity corresponded to those defined in GOST 20255.1-89 "Ionits, methods for determining exchange capacity".

The statical exchange capacity for indium (SEC(In)) for the sample of the sorbent produced according to the method described in example 3 was 2.9 mg-eq./g.

EXAMPLE 5

Determining of the dynamic exchange capacity of a complex-forming sorbent.

The dynamic exchange capacity was determined according to GOST 20255.2-89, subjecting to the following conditions:
a test sorbent was the sorbent produced in example 3;
a passed solution was work process solution No. 1 for sorption whose composition is given in Table 1.

TABLE 1

The composition of work process solution No. 1

| | Component | | | | | | | | | | |
|---|---|---|---|---|---|---|---|---|---|---|---|
| | In | Cd | Zn | Fe | Cu | As | Sb | Al | Sn | Si | $H_2SO_4$ |
| Concentration, g/l | 0.194 | 0.34 | 34.24 | 9.39 | 2.15 | 0.02 | 0.01 | 0.30 | 0.06 | 0.006 | 100 | the inner diameter of a column was 10 mm;
the initial volume of the sorption material was 4 ml (1 column volume);
the flow rate of the solution through a column was 16 ml/h;
the specific loading of the solution was 4 c.v./h (4 column volumes per hour); and
the volume of the solution passed through the column was 292 ml (73 column volumes).

Samples of the filtrate of a volume of 50 ml were gathered before equalizing the concentration of indium in the output of a column with the initial concentration of indium in the work solution (condition of complete saturation). The total dynamic exchange capacity (TDEC) for In was 240 g-eq./m$^3$.

Selectivity was tested by subjecting a sample of the dynamic saturated sorbent to mineralization, and the amount of elements in the sample was analyzed by ICP-spectrometry. The results are given in Table 2.

TABLE 2

Relative amounts of absorbed elements in the saturated sorbent

| Sample name | Weight ratio of elements | | | | | | | | | | Selectivity, s(In), % |
|---|---|---|---|---|---|---|---|---|---|---|---|
| | In | Cd | Zn | Fe | Cu | As | Sb | Al | Sn | Ti | |
| Saturated sorbent of example 5 | 1 | — | 0.10 | 1.38 | — | — | — | 0.12 | — | — | 38 |

Selectivity for indium, which was calculated as a ratio of the amount of absorbed indium to the total amount of all elements absorbed by the sorbent and expressed in percentage, was 38% for the sorbent of example 3 in the sorption from process solution No. 1.

EXAMPLE 6

Determining of capacity and selectivity of a complex-forming sorbent for indium in an apparatus equipped with a mixer.

Capacity was determined in a glass laboratory reactor equipped with a mixer and consisting of a 2 L three-necked round-bottom flask equipped with a fluoroplast (or glass) tube for subsurface supply of nitrogen, a gas vent connected with Zaitsev's absorber, and a mixer with a gland seal. The experiment was carried out, subjecting to the following conditions:
a test sorbent was the sorbent of example 3;
a test solution was work process solution No. 2 for sorption whose composition is given in Table 3;

TABLE 3

The composition of work process solution No. 2

| | Component | | | | | | | | | | |
|---|---|---|---|---|---|---|---|---|---|---|---|
| | In | Cd | Zn | Fe | Cu | As | Sb | Al | Sn | Si | $H_2SO_4$ |
| Concentration, g/l | 0.18 | 0.31 | 31.77 | 8.71 | 1.99 | 0.02 | 0.01 | 0.28 | 0.05 | 0.005 | 100 | the volume of the solution was 1300 ml;
the weight of the loaded sorbent was 3.3 g (based on dry product); and
the duration of sorption was 25 hours under stirring;

To carry out the experiment, the process solution was filled to the reactor, the mixer and the nitrogen supply were turned on and then a sample weight of the test sorbent was loaded.

Granules after saturation were separated from the suspension on a mesh and washed with a 10% solution of $H_2SO_4$ to remove ions which were not bound to the material. Capacity for indium was 0.636 mg-eq./g.

Selectivity was tested by subjecting a sample of the sorbent saturated in the reactor equipped with a mixer to mineralization, and the amount of elements in the sample was analyzed by ICP-spectrometry. The results are given in Table 4.

TABLE 4

Relative amounts of absorbed elements in the saturated sorbent

| Sample name | Weight ratio of elements | | | | | | | | | | Selectivity, s(In), % |
|---|---|---|---|---|---|---|---|---|---|---|---|
| | In | Cd | Zn | Fe | Cu | As | Sb | Al | Sn | Ti | |
| Saturated sorbent of example 6 | 1 | — | 0.04 | 0.05 | — | — | 0.06 | 0.21 | — | 0.09 | 69 |

Selectivity for indium, which was calculated as a ratio of the amount of absorbed indium to the total amount of all elements absorbed by the sorbent and expressed in percentage, was 69% for the sorbent of example 3 in the sorption from process solution No. 2.

EXAMPLE 7

Determining of capacity and selectivity of a complex.

Forming sorbent fog indium in an apparatus equipped with a mixer. Capacity was determined in a glass laboratory reactor equipped with a mixer, and consisting of a 2 L three-necked round-bottom flask equipped with a fluoroplast (or glass) tube for subsurface supply of nitrogen, a gas vent tube connected with Zaitsev's absorber, and a mixer with a gland seal. The experiment was carried out, subjecting to the following conditions:
a test sorbent was the sorbent of example 3;
a test solution was work process solution No. 3 for sorption whose composition is given in Table 5;

the volume of the solution was 1000 ml;
the weight of the loaded sorbent was 7.6 g (based on dry product); and
the duration of sorption was 25 hours under stirring;

To carry out the experiment, the process solution was filled to the reactor, the mixer and the nitrogen supply were turned on, and then a sample weight of the test sorbent was loaded.

Granules after saturation were separated from the suspension on a mesh, and washed with a 10% solution of $H_2SO_4$ to remove ions which were not bound to the material. The capacity for indium was 0.443 mg-eq./g.

EXAMPLE 8

Desorption of indium from a saturated complex-forming sorbent.

Desorption of indium from a saturated sorbent was carried out in a glass column, subjecting to the following conditions:
a test sorbent was the saturated sorbent from example 7;
the inner diameter of the column was 10 mm;
a desorption solution was 6 N HCl;
the initial volume of the sorption material was 18 ml (1 column volume);
the flow rate of the solution was 9 ml/h;
the specific load with the solution was 0.5 c.v./h (0.5 column volume per hour); and
the volume of the solution passed through the column was 80 ml (4.5 column volumes).

The weight ratio of elements in the desorbate, determined on the results of an analysis of the amount of elements in the solution on an ICP-spectrometer, is given in Table 6.

TABLE 5

The composition of work process solution No. 3

| | Component | | | | | | | | | | |
|---|---|---|---|---|---|---|---|---|---|---|---|
| | In | Cd | Zn | Fe | Cu | As | Sb | Al | Sn | Si | $H_2SO_4$ |
| Concentration, g/l | 0.213 | 0.31 | 31.77 | 8.71 | 1.99 | 0.02 | 0.01 | 0.28 | 0.05 | 0.005 | 100 |

TABLE 6

| Sample name | Relative amounts of elements in the desorbate | | | | | | | | | | Selectivity, s(In), % |
|---|---|---|---|---|---|---|---|---|---|---|---|
| | Weight ratio of elements | | | | | | | | | | |
| | In | Cd | Zn | Fe | Cu | As | Sb | Al | Sn | Ti | |
| Desorbate | 1 | — | 0.01 | 0.02 | 0.02049 | — | 0.00 | 0.02 | — | 0.04 | 90 |

Selectivity for indium, which was calculated as a ratio of the amount of indium in the desorbate to the total amount of elements in the desorbate and expressed in percentage, was 90% for the sorbent of example 3, which was saturated according to the method disclosed in example 7.

Thus, the introduction of functional gem-diphosphonic groups by the treatment of a spherically granulated cross-linked macroporous acrylonitrile-divinylbenzene copolymer with phosphorous acid at elevated temperature allows the production of a complex-forming sorbent that can be useful in non-ferrous metallurgy and hydrometallurgy for a selective extraction of indium, and in the chemical industry, as well as for the production of special-purity substances. In addition, selectivity for indium and sorption capacity are increased, thus improving the application properties of the sorbent. The process of production is simple, and does not require further equipment in addition to that already used in the industry.

LIST OF SOURCES

1. Selective Separation of Indium by Iminodiacetic Acid Chelating Resin. Brazilian Journal of Chemical Engineering, 24(2), Pp. 287-292, (2007).
2. Indium Adsorption onto Ion Exchange Polymeric Resins. Minerals Engineering 16 (2003), 659-663
3. Complexing Properties of Diphonix, a New Chelating Resin with Diphosphonate Ligands, Toward Ga(III) and In(III), Separation Science and Technology, 29: 4, 543-549
3. U.S. Pat. No. 5,449,462. C02F 1/62, C02F 1/64, C02F 1/42. Dec. 9, 1995.
4. Laskorin B. N et al., "Non-ferrous metallurgy", No. 7, 29 (1972) Executive director ZAO "Aksion-Redkie i dragot-sennye metally" Kondrutskii D. A.

The invention claimed is:

1. A method for producing a gem-diphosphonic functional groups-containing, complex-forming sorbent for selective extraction of indium, the method comprising
   treating a spherically granulated cross-linked macroporous acrylonitrile-divinylbenzene copolymer with dried phosphorous acid at an elevated temperature with following separating and washing product granules with water and ethanol sequentially.
2. The method according to claim 1, characterized in that the treating is carried out in a melt of dried phosphorous acid at a temperature of from 140 to 160° C. for from 13 to 35 hours.
3. The method according to claim 1, characterized in that the treating with dried phosphorous acid is carried out in chlorobenzene at a temperature of from 100 to 130° C. for from 13 to 35 hours.

* * * * *